United States Patent
Zhou et al.

(10) Patent No.: US 11,554,540 B2
(45) Date of Patent: Jan. 17, 2023

(54) CONFORMAL MANUFACTURE METHOD FOR 3D PRINTING WITH HIGH-VISCOSITY MATERIAL

(71) Applicant: ZRapid Technologies Co., Ltd., Suzhou (CN)

(72) Inventors: Hongzhi Zhou, Suzhou (CN); Yinsheng Liang, Suzhou (CN)

(73) Assignee: ZRapid Technologies Co., Ltd., Suzhou (CN)

( * ) Notice: Subject to any disclaimer, the term of this patent is extended or adjusted under 35 U.S.C. 154(b) by 327 days.

(21) Appl. No.: 16/609,165

(22) PCT Filed: Sep. 11, 2018

(86) PCT No.: PCT/CN2018/105046
§ 371 (c)(1),
(2) Date: Oct. 28, 2019

(87) PCT Pub. No.: WO2020/037732
PCT Pub. Date: Feb. 27, 2020

(65) Prior Publication Data
US 2021/0331379 A1 Oct. 28, 2021

(30) Foreign Application Priority Data
Aug. 24, 2018 (CN) .......................... 201810973438.6

(51) Int. Cl.
*B29C 64/135* (2017.01)
*B29C 64/393* (2017.01)
(Continued)

(52) U.S. Cl.
CPC .......... *B29C 64/135* (2017.08); *B29C 64/393* (2017.08); *B33Y 10/00* (2014.12); *B33Y 50/02* (2014.12)

(58) Field of Classification Search
CPC ..... B29C 64/135; B29C 64/393; B33Y 50/02; B33Y 10/00
See application file for complete search history.

(56) References Cited

U.S. PATENT DOCUMENTS

| | | | | |
|---|---|---|---|---|
| 5,398,193 A | * | 3/1995 | deAngelis | B33Y 40/00 700/119 |
| 2003/0222366 A1 | * | 12/2003 | Stangel | A61C 5/77 264/16 |

(Continued)

FOREIGN PATENT DOCUMENTS

CN 106738874 A * 5/2017 ............. B33Y 10/00

*Primary Examiner* — Alexander M Weddle
(74) *Attorney, Agent, or Firm* — Wang Law Firm, Inc.

(57) ABSTRACT

The present disclosure discloses a conformal manufacture method for 3D printing with high-viscosity material. The method comprises the steps: using 3D design software to design a 3D model of a component and a conformal contactless support; importing the 3D model data of the component and the conformal contactless support into slice software; importing multiple slice data of the component and the conformal contactless support into a 3D printing device, and sequentially scanning a high-viscosity material by laser till completing the printing; and removing the support and the uncured materials to finally obtain the component. The support and the component to be manufactured are easy to be separated, and no trace is left on the surface of the component. The present disclosure provides a conformal contactless support method for manufacturing a component having a complex bottom surface structure by using a 3D printing technology, and has a wide application prospect in the field of 3D manufacture.

6 Claims, 2 Drawing Sheets

(51) Int. Cl.
  *B33Y 10/00*  (2015.01)
  *B33Y 50/02*  (2015.01)

(56) References Cited

U.S. PATENT DOCUMENTS

| | | | |
|---|---|---|---|
| 2015/0102531 A1* | 4/2015 | El-Siblani | B29C 64/135 |
| | | | 264/401 |
| 2017/0136708 A1* | 5/2017 | Das | B33Y 10/00 |
| 2017/0251713 A1* | 9/2017 | Warner | B29C 64/106 |
| 2018/0111334 A1* | 4/2018 | Gold | B22F 10/40 |

\* cited by examiner

CONFORMAL MANUFACTURE METHOD FOR 3D PRINTING WITH HIGH-VISCOSITY MATERIAL

TECHNICAL FIELD

The present disclosure relates to the technical field of additive manufacturing, and in particular to a conformal manufacture method for 3D printing with high-viscosity material, which is also suitable for a 3D printing technology of a high-viscosity material including ceramic and the like.

BACKGROUND 3D printing technology is to perform laser scanning on multiple layers of an adhesive material such as a special wax material, powder metal, plastic and the like based on a digital model file to manufacture a 3D object. Such technology has high molding precision, greatly shortens a development cycle of products, improves productivity, reduces production costs and improves competitiveness of the enterprise. Furthermore, the 3D printing technology can also print some internal cavities and appearances which cannot be manufactured by the traditional production technologies, simplifies the whole production procedure and has the characteristics of rapidness, high efficiency and the like.

The 3D printing technology can use numerous materials, wherein in order to prevent warping deformation influenced by thermal stress and also prevent spheroidization or sinking removal influenced by surface tension, molding technologies such as SLA, FDM, SLM, EBSM and the like require to add a support on an overhanging structure of a molded component to ensure successful printing of the component.

In a 3D printing procedure, the component needs to be supported by a supporting structure, wherein the support should fully consider an overhanging structure of the component such that the support should have a certain strength and is not broken under the influence of the thermal stress or the scratch of the scraper, the support should be conveniently removed after the manufacture is completed, and the structure of the component is not broken when the support is removed; and a post-processing time of the support is shortened, and the surface quality of a supporting surface is improved.

A common supporting structure of the current 3D printing technology comprises a thin-wall support and a solid support, wherein the thin-wall support comprises a point support, a line support, a block support, a mesh support and the like, such support has a complete coverage on the overhanging surface of the component and low strength, and is easy to be broken due to influence of the thermal stress so as to cause molding failure, the following removing time of support is long, and after a fine structure adds the thin-wall support, the support is hard to be removed; and the solid support mainly comprises a prototype support and a thickened block support, such support has a great strength and is not easy to be broken, but the molding time of support is long, too much powder is consumed, and the support is hard to be removed subsequently. As shown in FIG. 1, a ceramic denture is in contact with the surface of the component, so, after a support is removed, there is a serious damage on the surface of the component.

Chinese Patent Application No. 2016214673815 discloses a tree-shaped supporting structure, wherein a branch portion of the support has an axisymmetric structure and is cylindrical, the cylindrical branch increases a contact area with the component, and because the diameter of the cylinder is large and consistent, the branches are not easy to be broken when the support is removed, or are not broken at preset portions so as to cause damage to the component, which also increases the following processing steps of the surface of the component.

SUMMARY

To solve the above technical problems, the present disclosure provides a conformal manufacture method for 3D printing with high-viscosity material to avoid surface damage of components.

In order to achieve the above objectives, a technical solution of the present disclosure is as follows:

the conformal manufacture method for 3D printing with high-viscosity material comprises the following steps:

step 1, using 3D design software to design a 3D model of a component and a conformal contactless support to obtain 3D model data of the component and the conformal contactless support, wherein a gap with a certain thickness is arranged between the support and the component, and an upper surface of the support and a lower surface of the component are consistent morphologically;

step 2, importing the obtained 3D model data of the component and the conformal contactless support into slice software to obtain multiple slice data of the component and the conformal contactless support;

step 3, importing the multiple slice data of the component and the conformal contactless support into a 3D printing device, and sequentially scanning a high-viscosity material by laser till completing the printing so as to obtain a component and a support, wherein the component and the support are solid under laser irradiation, and the gap is not irradiated by the laser so as to maintain original shape and properties of the high-viscosity material; and step 4, removing the support and the uncured materials to finally obtain the component.

Furthermore, the support is formed by a conformal contactless support and is used for supporting the bottom of the component.

Furthermore, the shape and size of the support can be adjusted according to the morphology of the bottom surface of a component to be printed.

Furthermore, the high-viscosity material is a photosensitive material, and its viscosity range is between 1000 cps and 1000000 cps.

Furthermore, the size of the gap is 1-100 times of the thickness of a slice of the component.

Furthermore, the high-viscosity material in the gap can be achieved in any mode of extruding, scraping or spraying.

Furthermore, printing parameters of the support and the component are the same or different.

By the above technical solution, according to the conformal manufacture method for 3D printing with high-viscosity material of the present disclosure, due to the gap between the component and the support, not only a component at an upper portion is supported, but also the support and the component are easy to be separated, and no trace is left on the surface of the component to guarantee the completeness of the component; furthermore, the printing parameters of the support and the component are the same or different such that high printing efficiency can be achieved.

BRIEF DESCRIPTION OF THE DRAWINGS

To describe the technical solutions in the embodiments of the present disclosure more clearly, the following briefly introduces the accompanying drawings for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure. All other embodiments obtained by a person of ordinary skill in the art based on the embodiments of the present disclosure without creative efforts shall fall within the protection scope of the present disclosure.

Specific embodiments of the present disclosure will be further described in detail with reference to the accompanying drawings.

Figure 1:
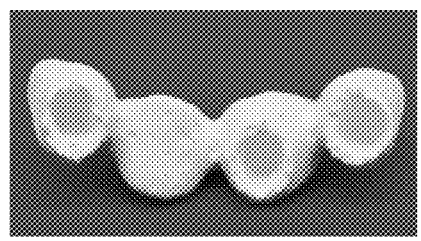
FIG. 1 is a ceramic denture obtained by the prior art after a support is removed.
Figure 2:
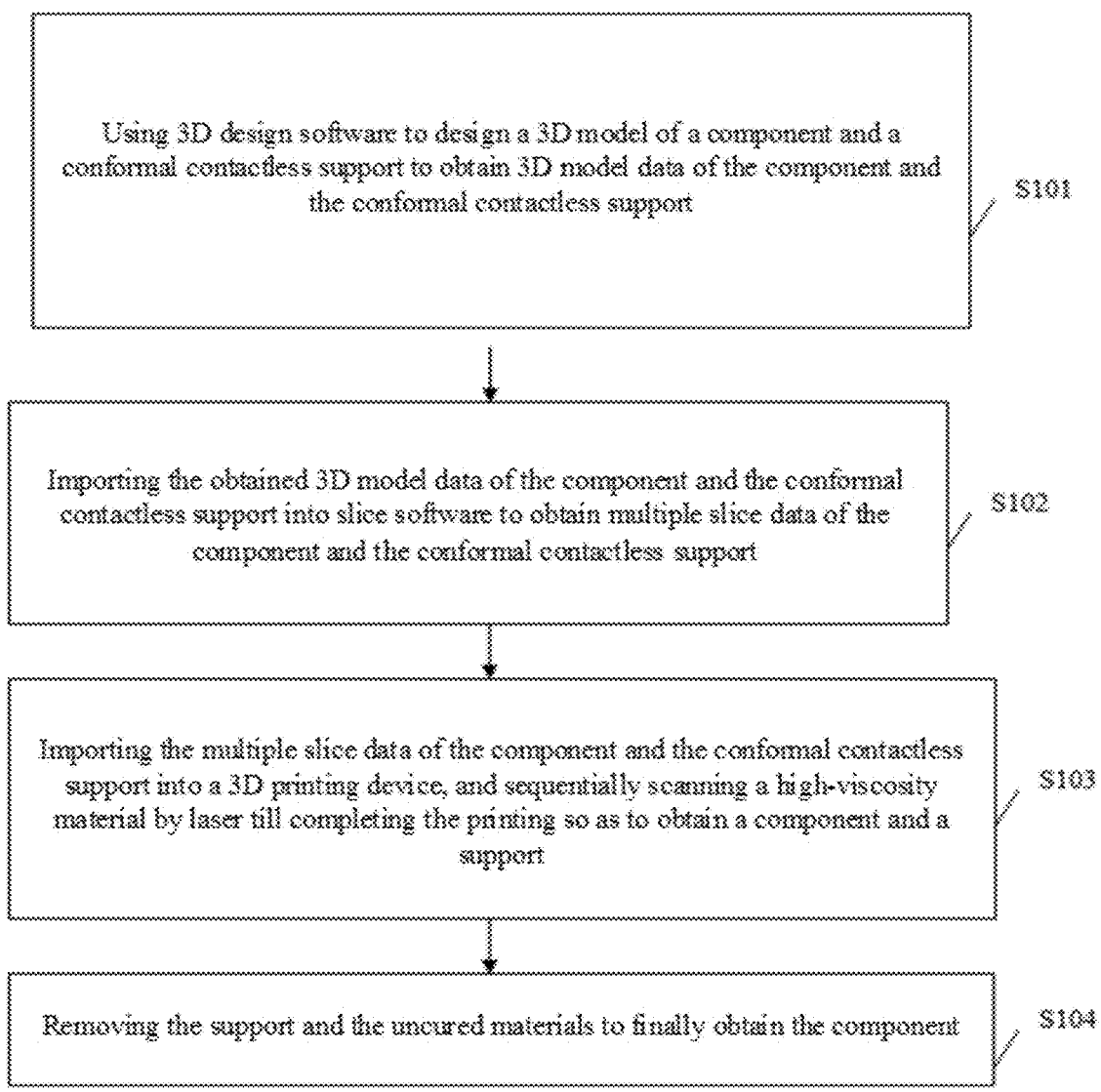
FIG. 2 is a flow chart of a conformal manufacture method for 3D printing with high-viscosity material disclosed by the present disclosure.

As shown in FIG. 2, a conformal manufacture method for 3D printing with high-viscosity material comprises the following steps:

S101, using 3D design software to design a 3D model of a component and a conformal contactless support to obtain 3D model data of the component and the conformal contactless support, wherein a gap with a certain thickness is arranged between the support and the component, and an upper surface of the support and a lower surface of the component are consistent morphologically;

S102, importing the obtained 3D model data of the component and the conformal contactless support into slice software to obtain multiple slice data of the component and the conformal contactless support;

S103, importing the multiple slice data of the component and the conformal contactless support into a 3D printing device, and sequentially scanning a high-viscosity material by laser till completing the printing so as to obtain a component and a support, wherein the component and the support are solid under laser irradiation, and the gap is not irradiated by the laser so as to maintain original shape and properties of the high-viscosity material; and S104, removing the support and the uncured materials to finally obtain the component.

It should be noted that, when the 3D model of the support is designed, the shape and size of the support can be adjusted according to the morphology of the bottom surface of a component to be printed and is subject to conditions that consumables of a conformal contactless support are the least and a component at an upper portion is sufficiently supported.

The high-viscosity material is a photosensitive material, its viscosity range is between 1000 cps and 1000000 cps, and the high-viscosity material may also be pasty ceramic or resin material, but is not limited thereto.

The size of the gap is 1-100 times of the thickness of a slice of the component in order that the support can be easily peeled off and does not damage the surface of the component. A printing material in the gap can be achieved in any mode of extruding, scraping or spraying, but is not limited thereto.

Printing parameters of the support and the component are the same or different according to different printing requirements of the component such that high printing efficiency can be achieved.

Figure 3:
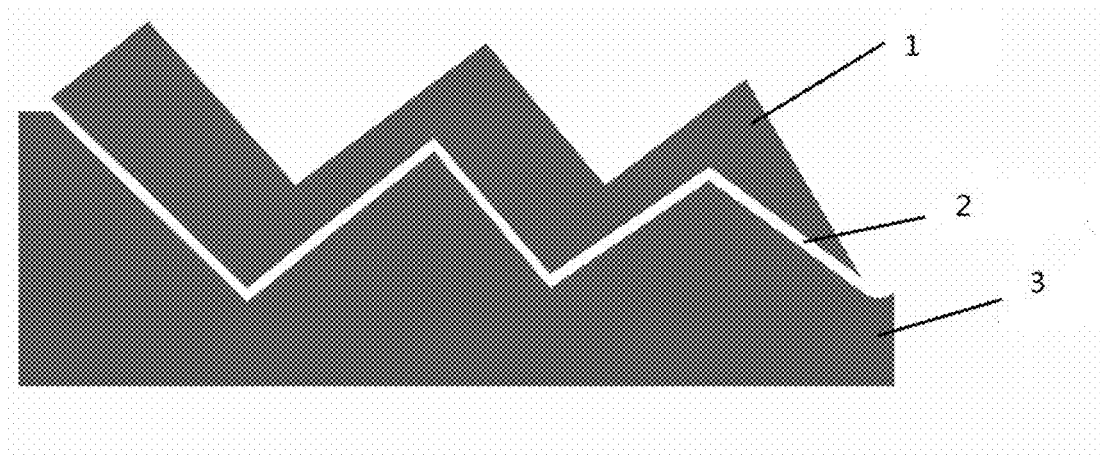
FIG. 3 is a sectional view of a serrate component, a gap and a support disclosed by the present disclosure.

According to the above method, the component is not collapsed by utilizing its own supportability of the high-viscosity material and the paved gap, and the high-viscosity material cannot be scraped away during transverse coating due to characteristics of the high-viscosity material; due to the high-viscosity material in the gap, the component and the support can be easily separated and the surface of the component is not damaged; and as shown in FIG. 3, which is a sectional view of a serrate component 1, a gap 2 and a support 3, during printing and after transverse coating, laser scanning is performed according to the slice data, laser is closed when there is no slice data, and this cycle repeats until the printing of the whole serrate component 1 is completed.

Embodiment 1

Steps of manufacturing a component having a complex bottom surface structure with a high-viscosity photosensitive resin material are: firstly performing a 3D model design and slice on a plastic component and support to be printed, secondly importing slice data of the plastic component and the support into a light curing 3D printer, sequentially irradiating slice layers of the plastic component and a base support to form solid component and base support, shutting the laser, coating the photosensitive resin material on a conformal contactless gap by a coating device in order that at least one layer maintains original properties of the photosensitive resin material, and finally removing the uncured material in the conformal contactless gap and the base support, thereby obtaining the plastic component having the complex bottom surface structure. Main printing parameters are: a light source is 355 nm, a power is 300 mw, a laser scanning speed of the component is 4000 mm/s, a laser scanning speed of the base support is 2000 mm/s, the size of the gap is 0.3 mm, and the thickness of a slice is 0.1 mm.

Embodiment 2

Steps of manufacturing an alumina ceramic component having a complex bottom surface structure with alumina paste having a high viscosity characteristic are: firstly performing a 3D model design, a conformal contactless gap and a base support to be sliced, secondly importing slice data into a ceramic 3D printer, sequentially scanning the alumina paste to form a solid alumina ceramic component and support, circularly coating a gap by using a scraping mechanism when the laser is shut till the printing of the whole component is completed, then removing the support, debinding and sintering to finally obtain the alumina ceramic component. Main printing parameters are: a light source is 355 nm, a power is 300 mw, a scanning speed of the ceramic component and a scanning speed of the base are 4000 mm/s, the size of the gap is 0.21 mm, and the thickness of a slice is 0.07 mm. Main debinding and sintering parameters are: the temperature is increased from the room temperature to 120 degrees centigrade for 4 h and is maintained for 5 h; the temperature is increased from 120 degrees centigrade to 600 degrees centigrade for 16 h and is maintained for 2 h; the temperature is increased from 600 degrees centigrade to 1580 degrees centigrade for 3.26 h and is maintained for 2 h; and the temperature is cooled to the room temperature with the furnace.

Embodiment 3

Figure 4:
FIG. 4 is a picture of a zirconia ceramic denture having a complex occlusal surface disclosed by Embodiment 3 of the present disclosure.

As shown in FIG. 4, steps of manufacturing a zirconia ceramic denture having a complex occlusal surface by using a high-viscosity zirconia photosensitive material are: firstly performing a 3D model design of a ceramic denture and a conformal contactless gap and a support to be printed, secondly importing slice data into a ceramic 3D printer, sequentially scanning zirconia paste by using laser to form a solid ceramic denture component and support, circularly coating a gap by using a scraping mechanism when the laser is shut till the printing of the whole component is completed, then removing the support to obtain the zirconia ceramic denture green body with high surface quality, debinding and sintering to finally obtain the zirconia ceramic denture. Main printing parameters are: a light source is 355 nm, a power is 600 mw, a scanning speed of the zirconia ceramic denture is 1000 mm/s, a scanning speed of a base support is 4000 mm/s, the size of the gap is 0.12 mm, and the thickness of a slice is 0.04 mm. Main debinding and sintering parameters are: the temperature is increased from the room temperature to 75 degrees centigrade for 4 h and is maintained for 6 h; the temperature is increased from 75 degrees centigrade to 170 degrees centigrade for 6 h and is maintained for 8 h; the temperature is increased from 170 degrees centigrade to 330 degrees centigrade for 20 h and is maintained for 6 h; the temperature is increased from 330 degrees centigrade to 500 degrees centigrade for 14 h; the temperature is increased from 500 degrees centigrade to 1250 degrees centigrade for 7.5 h; the temperature is increased from 1250 degrees centigrade to 1450 degrees centigrade for 1 h and is maintained for 2 h; and the temperature is cooled from 1450 degrees centigrade to the room temperature for 36 h.

The above component is not in contact with the support, and due to the gap having the original characteristics of the high-viscosity material, the component and the support are very easy to be peeled off, and no trace is left on the surface of the component.

The foregoing descriptions is merely preferred embodiments of the disclosure, it should be noted that various modifications and variations can be made by those ordinarily skilled in the art without departing from the creation and conception of the present disclosure and are within the scope of the present disclosure.

What is claimed is:

1. A conformal manufacture method for 3D printing with high-viscosity material, wherein the method comprises the following steps:
   step 1, using 3D design software to design a 3D model of a component and a support to obtain 3D model data of the component and the support, wherein a gap with a certain thickness is arranged between the support and the component, and an upper surface of the support conforms to a lower surface of the component;
   step 2, importing the obtained 3D model data of the component and the support into slice software to obtain multiple slice data of the component and the support;
   step 3, importing the multiple slice data of the component and the support into a 3D printing device, and sequentially scanning a high-viscosity material by laser till to obtain the component and the support by printing, wherein the component and the support are solid under laser irradiation, and the gap is not irradiated by the laser so as to maintain original shape and properties of the high-viscosity material; and
   step 4, removing the support and the uncured materials to finally obtain the component,
   wherein the high-viscosity material is a photosensitive material, and its viscosity range is between 1000 cps and 1000000 cps.

2. The conformal manufacture method for 3D printing with high-viscosity material according to claim 1, wherein the support is formed by a conformal contactless support.

3. The conformal manufacture method for 3D printing with high-viscosity material according to claim 1, wherein the shape and size of the support can be adjusted according to the morphology of a bottom surface of the component to be printed.

4. The conformal manufacture method for 3D printing with high-viscosity material according to claim 1, wherein the high-viscosity material in the gap is deposited by extruding, scraping or spraying.

5. The conformal manufacture method for 3D printing with high-viscosity material according to claim 1, wherein printing parameters of the support and printing parameters of the component are the same.

6. The conformal manufacture method for 3D printing with high-viscosity material according to claim 1, wherein printing parameters of the support and printing parameters of the component are different.

* * * * *